United States Patent
Boettcher

(10) Patent No.: US 7,469,957 B1
(45) Date of Patent: Dec. 30, 2008

(54) FRONT FLOOR FRAME

(75) Inventor: Eric Boettcher, Columbus, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/952,581

(22) Filed: Dec. 7, 2007

(51) Int. Cl.
*B60J 7/00* (2006.01)

(52) U.S. Cl. .................................. 296/193.07

(58) Field of Classification Search ............ 296/193.07, 296/204, 203.02, 209
See application file for complete search history.

(56) References Cited

U.S. PATENT DOCUMENTS

| | | | |
|---|---|---|---|
| 5,002,333 A | 3/1991 | Kenmochi et al. |
| 5,085,484 A | 2/1992 | Mori |
| 5,567,005 A | 10/1996 | Kosuge et al. |
| 5,641,194 A | 6/1997 | Honma et al. |
| 5,806,918 A | 9/1998 | Kanazawa |
| 6,203,099 B1 | 3/2001 | Iwatsuki |
| 6,234,568 B1 | 5/2001 | Aoki |
| 6,270,153 B1 | 8/2001 | Toyao et al. |
| 6,679,523 B2 | 1/2004 | Yamamoto et al. |
| 6,857,691 B2 | 2/2005 | Kuroda et al. |
| 6,926,352 B2 | 8/2005 | Gotou et al. |
| 7,025,412 B2 | 4/2006 | Nakamura et al. |
| 7,118,167 B2 | 10/2006 | Nakamura et al. |
| 7,147,275 B2 | 12/2006 | Matsuyama et al. |
| 2002/0195840 A1 | 12/2002 | Mishima et al. |

*Primary Examiner*—Joseph D Pape
(74) *Attorney, Agent, or Firm*—Rankin, Hill & Clark LLP; Mark E. Duell

(57) ABSTRACT

A floor frame for an automotive vehicle is provided and includes a longitudinal center frame member having a W-shaped cross section, two longitudinal side frame members having C-shaped cross sections, a front cross member, a rear cross member and a first pair of central cross members, two side branch members and two center branch members all having U-shaped cross sections. Each side branch member is attached to a front frame and extends from the front frame at a downward and outward angle and connects to each side frame member. Each center branch member is attached to the front frame and extends from the front frame at a downward and inward angle and connects to a first end of the center frame thereby forming a first Y-joint. The connection of the side branch and the center branch to the front frame form a pair of second Y-joints.

13 Claims, 5 Drawing Sheets

FRONT FLOOR FRAME

BACKGROUND OF THE INVENTION

1. Field of the Invention

The present invention relates to an automotive vehicle and more specifically to an improved floor frame for an automotive vehicle.

2. Description of Related Art

Referring to FIG. 11, a vehicle body structure 100 having a conventional floor frame 102 is illustrated. The floor frame 102 includes four longitudinal frame pieces including two longitudinal frame members 104 and two side sills 106, multiple cross members 108, multiple outriggers 110, and a center reinforcement member 112. The cross members 108 extend between the longitudinal frame members 104 and the outriggers 110 extend between the longitudinal frame members 104 and the side sills 106.

One disadvantage to the conventional floor frame 102 is that the distance between each longitudinal frame member 104 and the adjacent side sill 106 is not constant. In other words, the distance between each longitudinal frame member 104 and the adjacent side sill 106 narrows running from the front to the rear of the floor frame 102. Thus, multiple exclusive cross members 108 are required to connect the two longitudinal frame members 104 and multiple exclusive outriggers 110 are required to connect each longitudinal frame member 104 to the adjacent side sill 106. This in turn increases tooling costs thereby increasing the cost of the vehicle.

Another disadvantage to the conventional floor frame 102 is the distance d2 between the longitudinal frame members 104. Referring to FIG. 10, the distance d2 illustrates the amount of unsupported floor 114 between each longitudinal frame member 104. In the present invention the amount of unsupported floor is reduced, which improves side impact performance as will be described further below.

Still yet another disadvantage to the conventional floor frame 102 is the dispersion of the energy load paths in the event of a frontal impact. A single energy load path 116 is generated in each longitudinal frame member 104 whereas in the present invention two load paths are created, which efficiently manages overall performance, as will be described further below.

SUMMARY OF THE INVENTION

In accordance with one aspect, the present invention overcomes the above mentioned disadvantages by providing a floor frame for an automotive vehicle comprising three-substantially parallel longitudinal frame members including a center frame member having a W-shaped cross section and two side frame member, multiple-substantially parallel cross members including a front cross member, a rear cross member and a first pair of central cross members, multiple branch members including two side branch members and two center branch members, where each side branch member is operatively connected to a front frame whereby each side branch member extends from the front frame at a downward and outward angle and connects to each side frame member, where each center branch member is operatively connected to the front frame whereby each center branch extends from the front frame at a downward and inward angle and connects to a first end of the center frame thereby forming a first Y-joint, and where the connection of the side branch and the center branch to the front frame form a pair of second Y-joints.

In accordance with another aspect, the present invention provides a second pair of central cross members located between the first pair of central cross members and the rear cross member, where both the first and second pair of central cross members are identical cross members, and wherein a first end of each central cross member is operatively attached to the side frame member and a second end of each central cross member is attached to the center frame thereby forming a pair linear connections between the two side frame members.

Additional benefits and advantages of the present invention will become apparent to those skilled in the art to which it pertains upon a reading and understanding of the following detailed specification.

BRIEF DESCRIPTION OF THE DRAWINGS

The invention may take physical form in certain parts and arrangement of parts, a preferred embodiment of which will be described in detail in this specification and illustrated in the accompanying drawings that form a part of the specification.

DETAILED DESCRIPTION OF THE INVENTION

Figure 1:
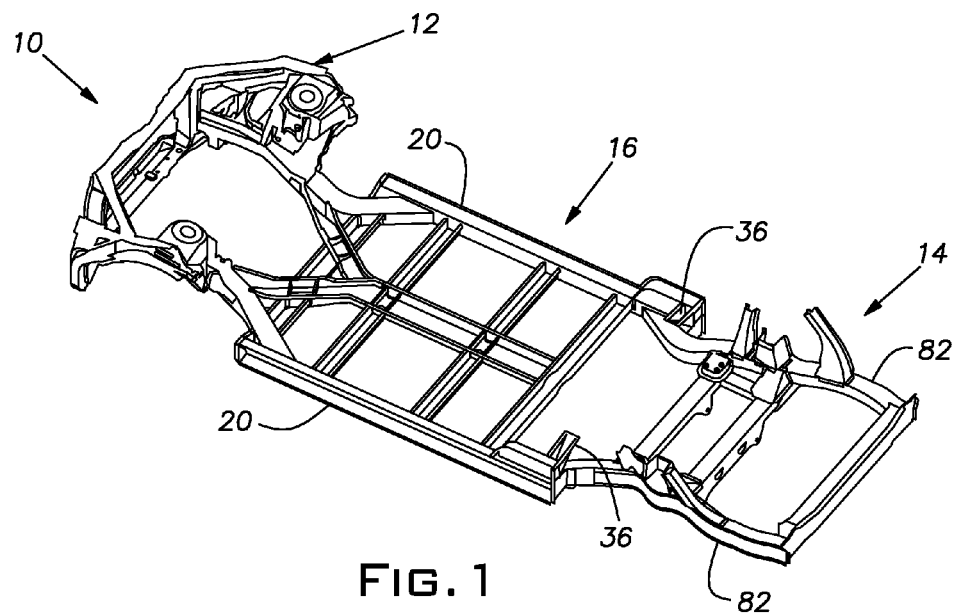
FIG. 1 is a top view of a vehicle body structure having a floor frame in accordance with the present invention.

Referring now to the drawings, FIG. 1 shows a vehicle body structure 10 having a front frame 12, a rear frame 14 and a floor frame 16. It should be noted that in the accompanying drawings, "front," "rear," "left," "right," "up," and "down" indicate directions as viewed from the driver's position. Further, the front frame 12 and rear frame 14 are of the type commonly known in the art and will not be described herein.

Figure 2:
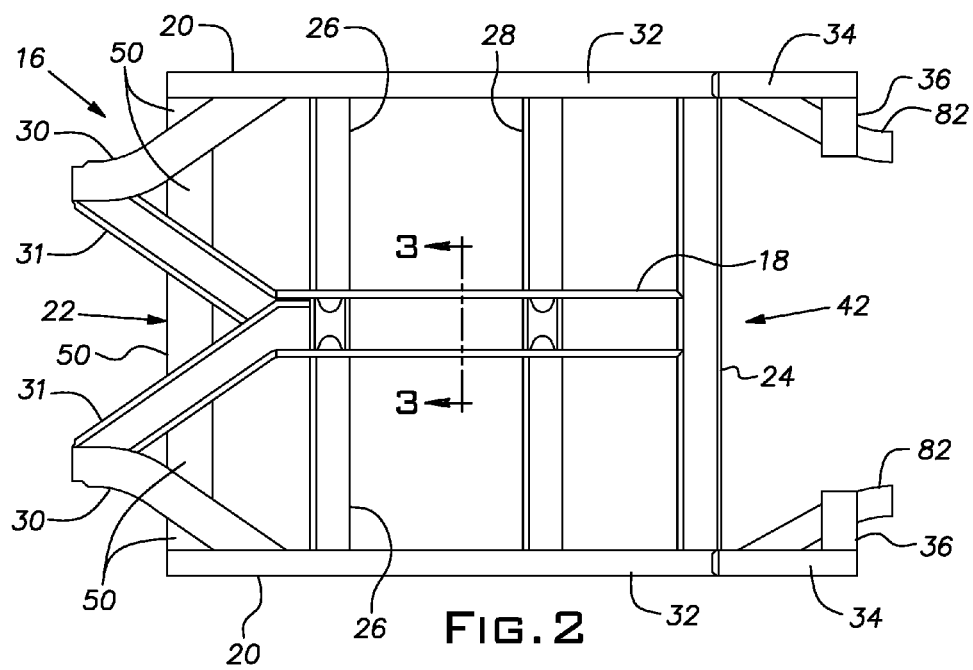
FIG. 2 is a top view of the floor frame.

Referring to FIGS. 1 and 2, the floor frame 16 has three-substantially parallel longitudinal frame members including a center frame 18, and a pair of side sills 20 located on opposite sides of the center frame 18. The floor frame 16 further includes multiple-substantially parallel cross members including a front cross member 22, a rear cross member 24, two front-central cross members 26 and two rear-central cross members 28. The floor frame 16 still further includes multiple branch members including two side branch members 30 and two center branch members 31 that extend in a forward/upward direction and connect a front portion of the floor frame 16 to the front frame 12 as will be explained further below.

Still referring to FIGS. 1 and 2, each side sill 20 is a separate integrated frame member having either a C-shaped cross-section or a reverse C-shaped cross section. In other words, as viewed from the rear of the floor frame 16 the left side sill has a reverse C-shaped cross section and the right side sill has a C-shaped cross section. Thus, the C-shaped opening faces in an outward direction away from the vehicle. Each side sill 20 includes a main side sill 32 and a side sill extension 34. The main side sill 32 is the portion of the side sill 20 that extends between the front cross member 22 and the rear cross member 24. The side sill extension 34 is the portion of the side sill 20 that extends past the rear cross member 24. The side sill extensions 34 provide a support for a sill extension gusset 36, as shown in FIG. 1, to facilitate the mounting of additional framing. Further, the rear frame 14 attaches to the side sill extensions 34 as will be described further below.

Figure 3:
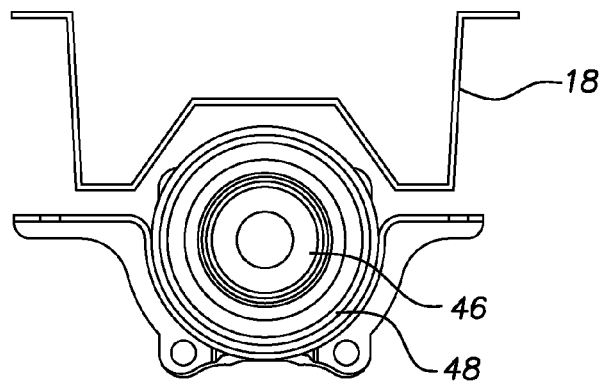
FIG. 3 is a cross section view taken at line 3-3 in FIG. 2.
Figure 4:
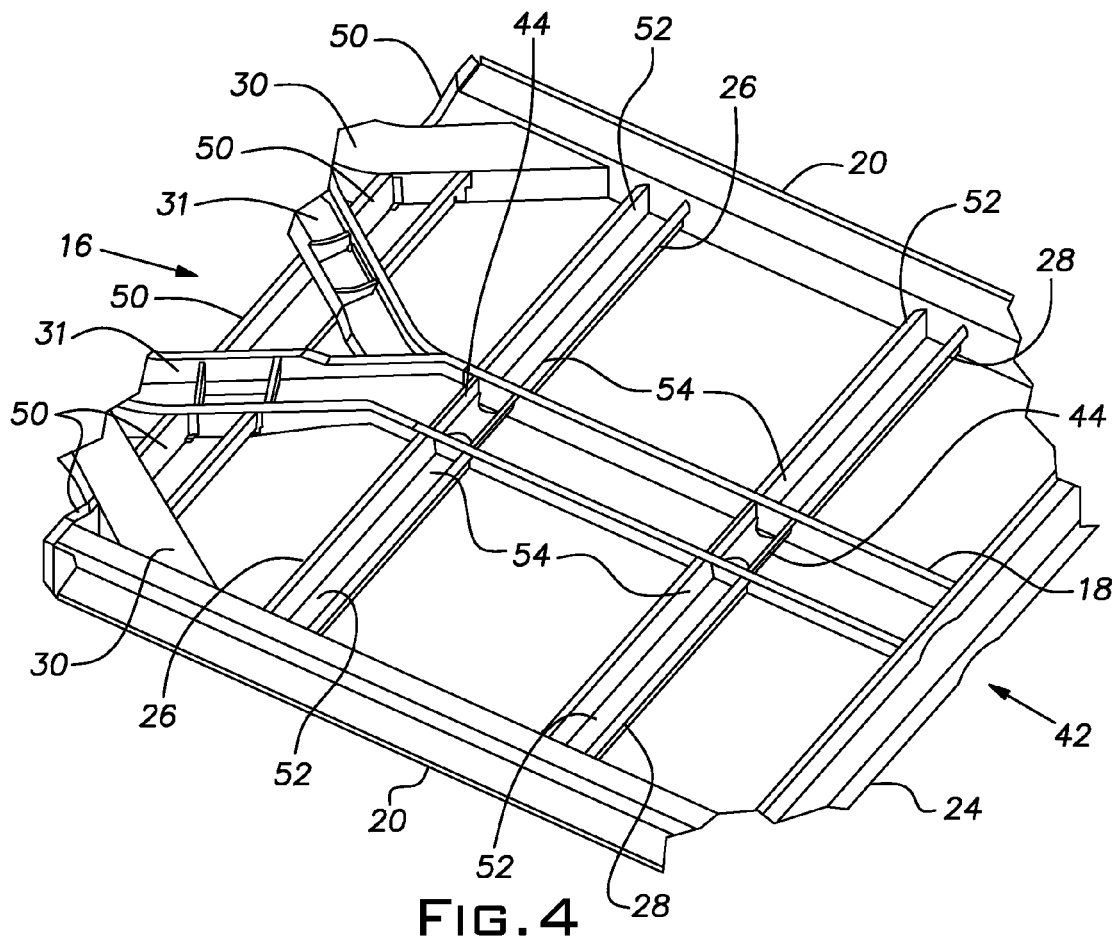
FIG. 4 is a perspective view showing the formation of a first Y-joint and a T-joint.

Referring to FIGS. 2-4, the center frame 18 has a W-shaped cross-section and is situated approximately halfway between the side sills 20. The center frame 18 is connected to the two front-central cross members 26 and extends to the rear cross member 24. A back end portion of the center frame 18 is connected to the approximate center of the rear cross member 24 to thereby form a T-joint 42. The center frame 18 can be connected to the rear cross member 24 by any mechanical means known in the art such as, but not limited to, welding. The center frame 18 further includes multiple reinforcement brackets 44 situated between the front-central cross members 26 and the rear-central cross members 28 to thereby provide additional support to the floor frame 16. As shown in FIG. 3, a center bearing 46 and a shaft 48 can be mounted to an underneath portion of the W-shaped cross-section of the center frame 18.

Referring to FIGS. 2 and 4, the front cross member 22 has a U-shaped cross-section and is comprised of multiple-smaller-front cross members 50 that are attached between each side sill 20 and a branch member 30, 31 and between each multiple branch member 30, 31. Thus, the multiple-front cross members 50 form a linear connection from one side sill 20 to the opposite side sill 20 across the front portion of the floor frame 16. The multiple-front cross members 50 may be connected to the side sills 20 and to the multiple branch members 30, 31 by any mechanical means known in the art such as, but not limited to, welding.

Referring back to FIGS. 1 and 2, the rear cross member 24 is an integrated part having a U-shaped cross section that connects to a rear portion of each side sill 20 such that each side sill 20 extends past the rear cross member 24 thereby forming the side sill extension 34 described above. The rear cross member 24, thus, forms a linear connection across the rear portion of the floor frame 16. The rear cross member 24 connects to a side of the side sill 20 opposite that of the C-shaped opening. The rear cross member 24 may be connected to the side sills 20 by any mechanical means known in the art such as, but not limited to, welding.

Referring to FIGS. 2 and 4, the central cross members 26, 28 have U-shaped cross-sections and are situated between the front cross member 22 and the rear cross member 24. Each central cross member 26, 28 includes a first end 52 and a second end 54, whereby the first end 52 attaches to the side of the side sill 20 opposite that of the C-shaped opening and the second end 54 attaches to the center frame 18. The central cross members 26, 28 are connected such that each pair of central cross members 26, 28 forms a continuous-linear connection from one side sill 20 to the opposite side sill 20. It should be noted that all the central cross members 26, 28 are identical parts. Thus, the central cross members 26, 28 can all be manufactured from a single die thereby reducing tooling and manufacturing costs. It should further be noted that depending on the length of the vehicle the number of central cross members 26, 28 may vary between two and four. In the embodiment shown in the figures the floor frame 16 includes four central cross members 26, 28. The central cross members 26, 28 may be connected to the center frame 18 and side sills 20 by any mechanical means commonly known in the art such as, but not limited to, welding.

Figure 5:
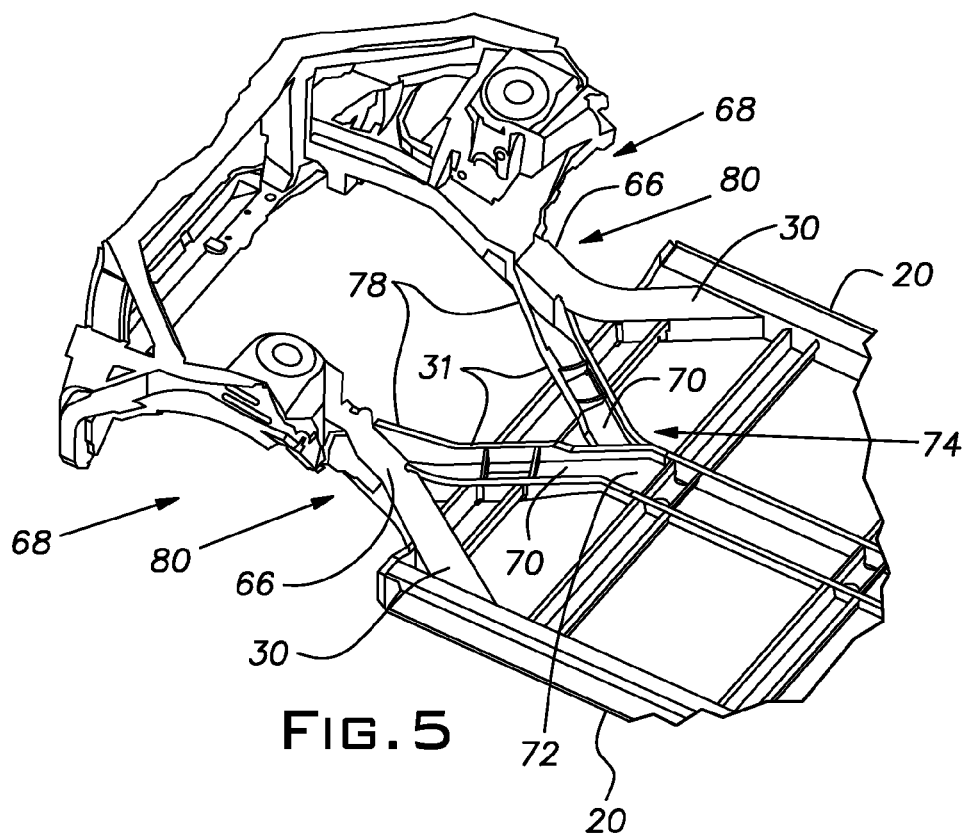
FIG. 5 is a perspective view showing the formation of side and center branches.
Figure 6:
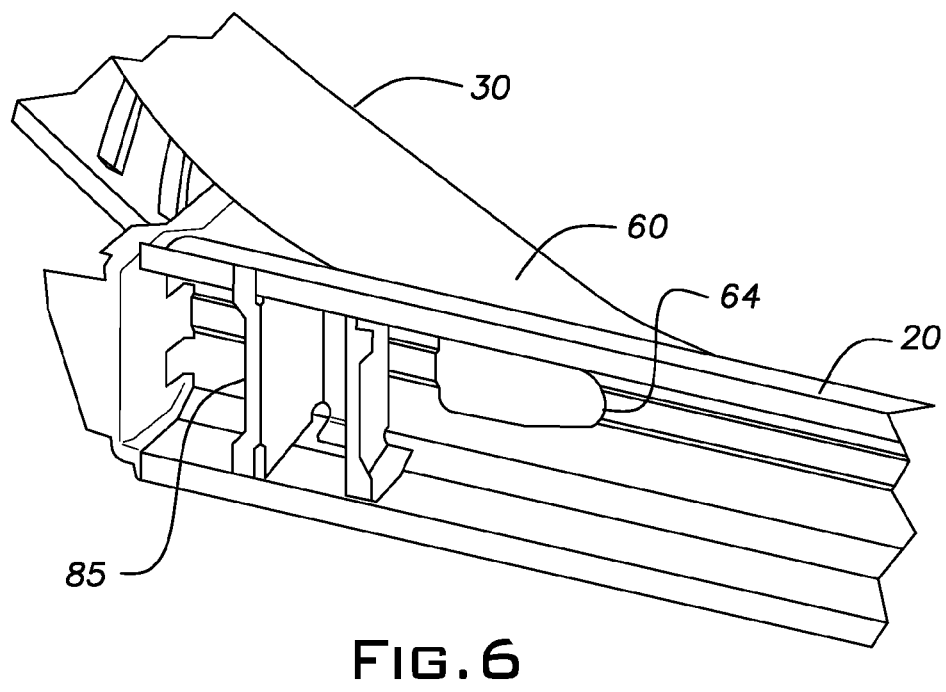
FIG. 6 is a close-up view showing the connection between the side branch and a side sill.

Referring to FIGS. 2, 5 and 6, as mentioned above, the multiple branch members 30, 31 connect the front portion of the floor frame 16 to the front frame 12. A first end 60 of each side branch 30 attaches to an associated side sill 20. More specifically, referring to FIG. 6, the first end 60 of each side branch 30 attaches to the side of the side sill 20 opposite that of the C-shaped opening thereby forming a joint. This joint provides a continuous energy load path from the front frame 12 to the floor frame 16.

A weld access opening 64 is formed in the side of the side sill 20 to allow welding of the side branch 30 to the side sill 20. Each side branch 30 extends at an inward/forward angle and intersects the front cross member 22 at an angle thereby forming a pair of first cross joints. Each side branch 30 continues through the front cross member 22 at an upward angle whereby a second end 66 of the side branch 30 connects to a wheel well portion 68 of the front frame 12 thereby connecting the front frame 12 to the floor frame 16. Prior to connecting to the wheel well portion 68 each side branch 30 curves at an angle such that the second end 66 is substantially parallel with the longitudinal frame members 18, 20.

Referring to FIGS. 2 and 5, a first end 70 of each center branch 31 connects to a front end 72 of the center frame 18 thereby forming a first Y-joint 74. Each center branch 31 extends at an outward/forward angle and intersects the front cross member 22 at an angle thereby forming a pair of second cross joints. Each center branch 31 continues through the front cross member 22 at an upward angle whereby a second end 78 of each center branch 31 connects to the wheel well portion 68 of the front frame 12 at the same location as the second end 66 of each side branch 30. Thus, the connection of the second end 78 of each center branch 31 to the second end 66 of each side branch 30 forming a pair of second Y-joints 80. Each second Y-joint 80 construction occurs at the macro structure level and provides two continuous energy load paths from the front frame 12 to the floor frame 16.

Figure 7:
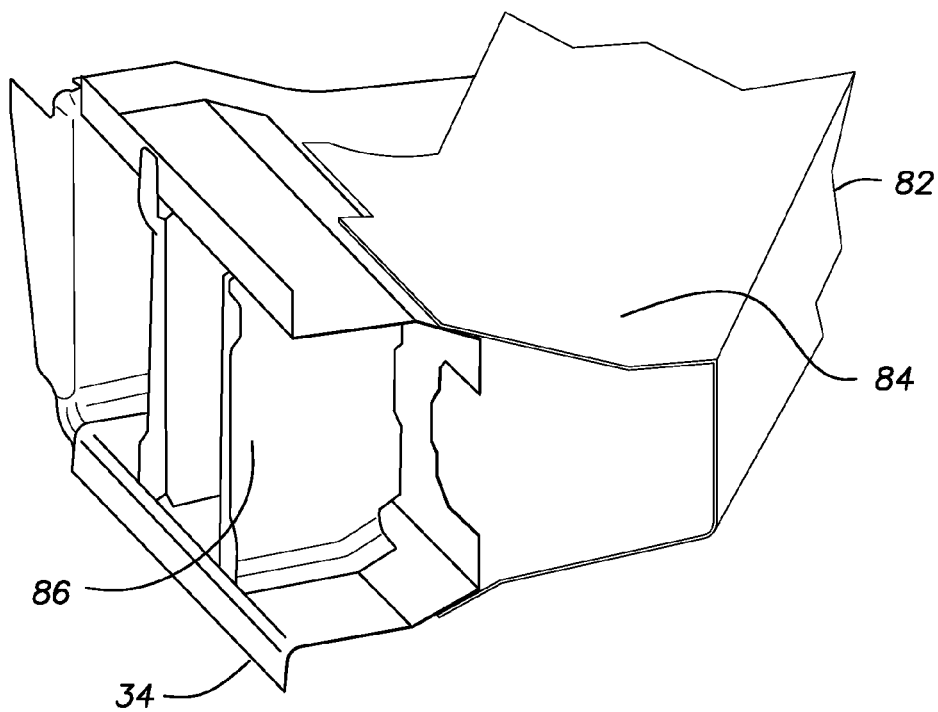
FIG. 7 is a close-up view showing the connection between a rear frame and the side sill.

Referring to FIGS. 1 and 7, the rear frame 14 includes two frame rails 82 that connect to each side sill extension 34. More specifically, as shown in FIG. 7, a front end portion 84 of each frame rail 82 is attached to the side of the side sill extension 34 opposite that of the C-shaped opening thereby forming a joint. This joint provides a continuous energy load path from the floor frame 16 to the rear frame 14.

Figure 8:
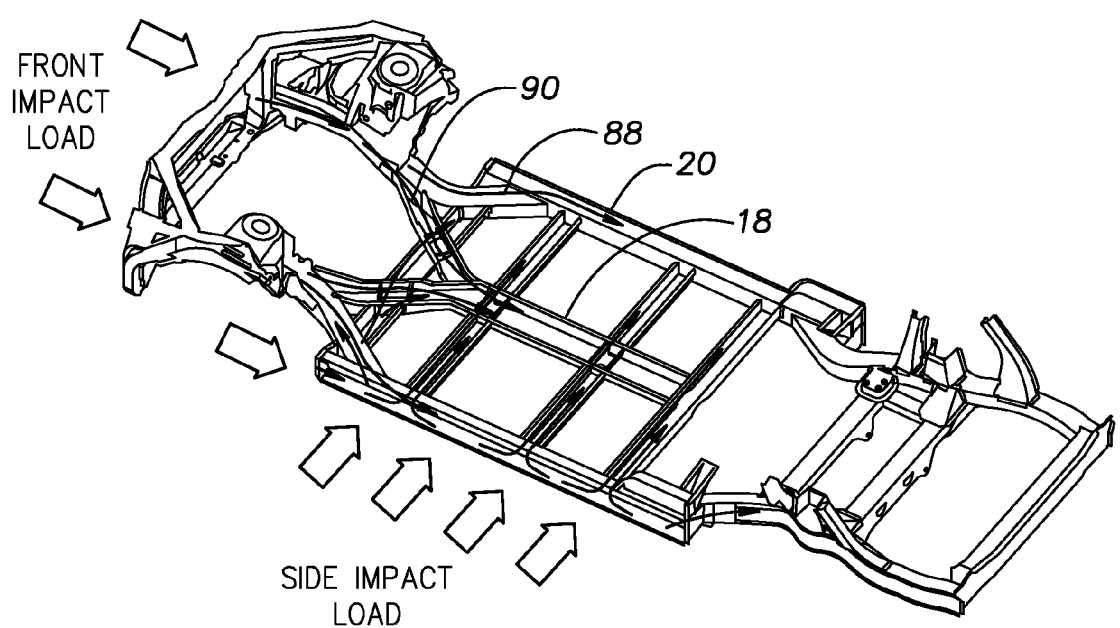
FIG. 8 is a perspective view of the vehicle body structure and the floor frame showing energy load paths resulting from a front or side impact.

Referring to FIGS. 6 and 8, two mounting brackets 85, 86 are situated in the C-shaped opening of the side sill 20. The first mounting bracket 85 is situated in a front portion 87 of the main side sill 32 at a point just behind the front cross member 22 but in front of the weld access opening 64. The second mounting bracket 86 is mounted in the side sill extension 34 behind the rear cross member 24. The mounting brackets 85, 86 extend vertically from the top of the C-shaped opening to the bottom of the C-shaped opening thereby forming a full-height connection between the top and bottom of the C-shaped opening. Further, the two mounting brackets 85, 86 close in the front and rear portion of the each side sill 20.

Referring to FIG. 8, as mentioned above, one advantage of the present invention over the conventional floor frame 102 is the management of energy load paths due to a front or side impact. In the event of a frontal impact load, two energy load paths, as opposed to one explained above in the conventional floor frame 102, are generated. One energy load path 88 flows through the side branch 30 and into the side sill 20 and a second energy load path 90 flows through the center branch 31 and into the center frame 18. Thus, the energy from a frontal impact load is directed via the multiple branch members 28 to the three longitudinal frame members and, therefore, dissipates in the center frame 18 and the two side sills 20. The inventive floor frame 14 can, thus, absorb and dissipate the energy from an impact while maintaining a degree of rigidity.

Figure 9:
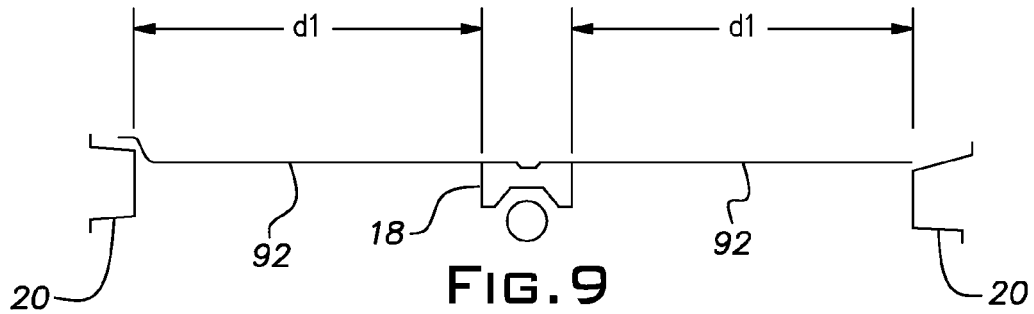
FIG. 9 is a schematic cross-section view of the floor frame.
Figure 10:
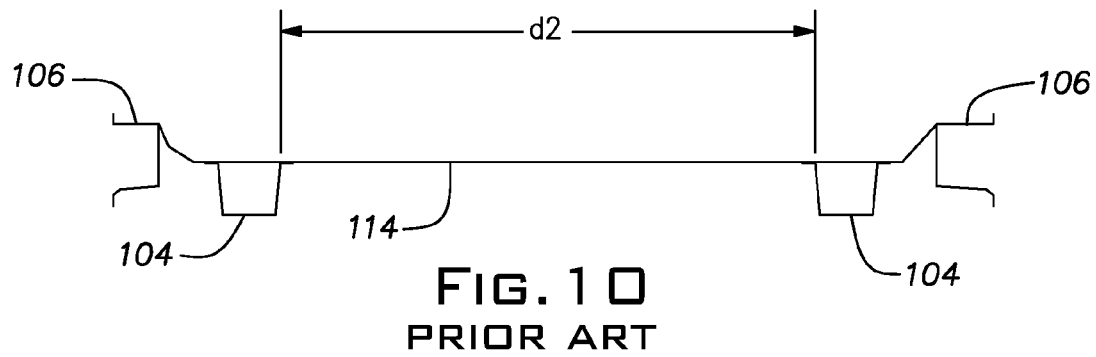
FIG. 10 is a schematic cross-section view of a conventional floor frame.
Figure 11:
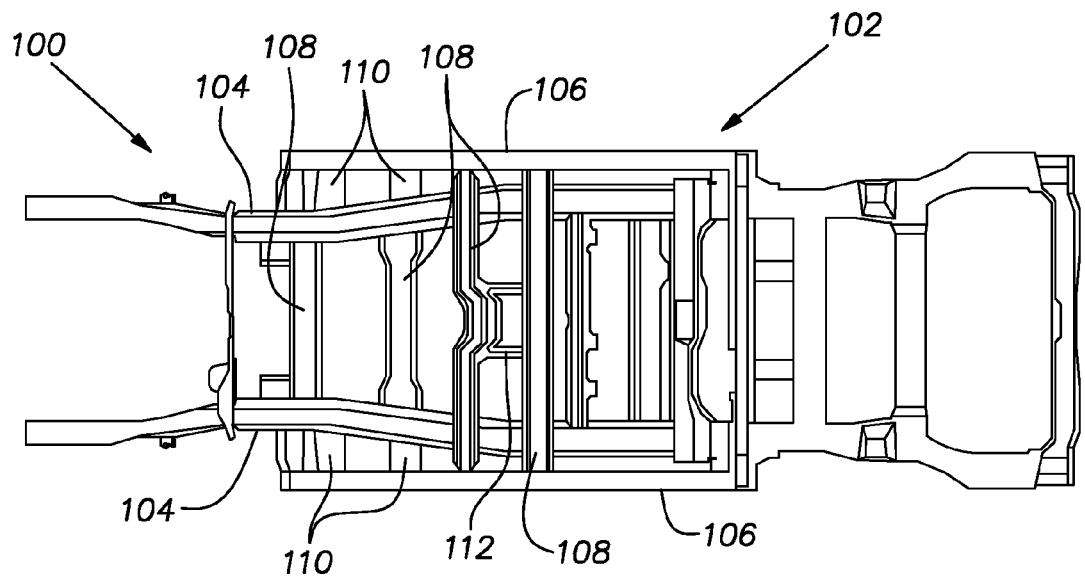
FIG. 11 is a top view of a conventional vehicle body structure and floor frame.

As mentioned above, another advantage of the inventive floor frame 16 over the conventional floor frame 102 is the improved floor panel support. Referring to FIG. 9 a floor panel 92 is supported by the side sill 20 at each end and by the center frame 18 in the middle. Thus, the amount of unsupported floor is the distance d1, which when compared to FIG. 10 is less than the distance d2. Further, as explained above the central cross members 26, 28 extend between each side sill 20 and the center frame 18. This reduces the length of unsupported framing between the three longitudinal frame members 18, 20 thereby improving side impact performance, as shown in FIG. 8.

While specific embodiments of the invention have been described and illustrated, it is to be understood that these embodiments are provided by way of example only and that the invention is not to be construed as being limited but only by proper scope of the following claims.

What is claimed is:

1. A floor frame for an automotive vehicle comprising:
   three-substantially parallel longitudinal frame members including a center frame member having a W-shaped cross section and two side frame members;
   multiple-substantially parallel cross members including a front cross member, a rear cross member and a first pair of central cross members;
   multiple branch members including two side branch members and two center branch members,
   wherein each side branch member is operatively connected to a front frame whereby each side branch member extends from the front frame at a downward and outward angle and connects to each side frame member,
   wherein each center branch member is operatively connected to the front frame whereby each center branch extends from the front frame at a downward and inward angle and connects to a first end of the center frame thereby forming a first Y-joint, and
   wherein the connection of the side branch and the center branch to the front frame form a pair of second Y-joints.

2. The floor frame of claim 1 further comprising a second pair of central cross members located between the first pair of central cross members and the rear cross member, wherein both the first and second pair of central cross members are identical cross members, and wherein a first end of each central cross member is operatively attached to the side frame member and a second end of each central cross member is attached to the center frame thereby forming a pair linear connections between the two side frame members.

3. The floor frame of claim 2, wherein the front cross member includes a plurality of smaller cross members each having a U-shaped cross section, wherein the smaller cross members operatively attach between the side frame members and the multiple branch members and between the multiple branch members thereby forming a linear connection between the two side frame members.

4. The floor frame of claim 3, wherein the rear cross member has a U-shaped cross section and is operatively attached to a rear portion of each side frame member, wherein the two side frame members include a main side frame and a side frame extension, wherein the main side frame extends between the front cross member and the rear cross member, and wherein the side frame extension is an extension of the side frame member that extends past the rear cross member.

5. The floor frame of claim 4, wherein the side frame members have a C-shaped cross section, wherein an opening of the C-shaped cross section faces in an outward direction away from the vehicle, and wherein a first end of each side branch member is operatively attached to a side of each side frame member opposite to that of the opening.

6. The floor frame of claim 5, wherein an underneath portion of the W-shaped center frame facilitates the mounting of a center bearing and a shaft and wherein the center frame is operatively attached to an approximate center of the rear cross member thereby forming a T-joint.

7. A vehicle body structure comprising:
   a front frame;
   a rear frame;
   a floor frame operatively connecting the front frame to the rear frame, the floor frame comprising:
      a center frame member having a W-shaped cross section and two side sill members having a C-shaped cross section;
      a front cross member, a rear cross member and a first pair of central cross members located between the front cross member and the rear cross member;
      two side branch members and two center branch members,
      wherein the first pair of central cross members are identical cross members whereby each central cross member connects to the center frame at one end and to the side frame member at the other end,
      wherein each side branch member is operatively connected to the front frame whereby each side branch member extends from the front frame at a downward/outward angle and connects to each side sill member,
      wherein each center branch member is operatively connected to the front frame whereby each center branch extends from the front frame at a downward/inward angle and connects to a first end of the center frame thereby forming a first Y-joint, and
      wherein the connection of the side branch and the center branch to the front frame form a pair second Y-joints.

8. The vehicle body structure of claim 7, wherein the floor frame further comprises a second pair of central cross members located between the first pair of central cross members and the rear cross member, wherein the second pair of central cross members are identical to the first pair of central cross members, and wherein a first end of each central cross member is operatively attached to the side sill member and a second end of each central cross member is attached to the center frame thereby forming a pair of linear connections between the two side sill members.

9. The vehicle body structure of claim 8, wherein the front cross member includes a plurality of smaller cross members each having a U-shaped cross section, wherein the smaller cross members operatively attach between the side sill members and the multiple branch members and between each multiple branch member thereby forming a linear connection between the two side sill members.

10. The vehicle body structure of claim 9, wherein the rear cross member has a U-shaped cross section and is operatively attached to a rear portion of each side sill member, wherein the two side sill members include a main side sill and a side sill extension, wherein the main side sill extends between the front cross member and the rear cross member, and wherein the side sill extension is an extension of the side sill member that extends past the rear cross member.

11. The vehicle body structure of claim 10, wherein the side sill members have a C-shaped cross section, wherein an opening of the C-shaped cross section faces in an outward direction away from the vehicle, wherein a first end of each side branch member is operatively attached to a side of each side sill member opposite to that of the opening.

12. The vehicle body structure of claim 11, wherein an underneath portion of the W-shaped center frame facilitates the mounting of a center bearing and a shaft and wherein the center frame is operatively attached to an approximate center of the rear cross member thereby forming a T-joint.

13. The vehicle body structure of claim 12, wherein the rear frame includes two frame rails and wherein a front end of each frame rail is operatively attached to a side of each side sill member opposite to that of the opening.

\* \* \* \* \*